United States Patent
Stoccardo

(10) Patent No.: US 9,332,732 B2
(45) Date of Patent: May 10, 2016

(54) SYSTEM FOR HANDS-FREE PET WASTE RECEPTACLE

(71) Applicant: David William Stoccardo, Bradenton, FL (US)

(72) Inventor: David William Stoccardo, Bradenton, FL (US)

( * ) Notice: Subject to any disclaimer, the term of this patent is extended or adjusted under 35 U.S.C. 154(b) by 49 days.

(21) Appl. No.: 14/092,530

(22) Filed: Nov. 27, 2013

(65) Prior Publication Data

US 2014/0144392 A1    May 29, 2014

Related U.S. Application Data

(60) Provisional application No. 61/730,849, filed on Nov. 28, 2012.

(51) Int. Cl.
*A01K 23/00*    (2006.01)

(52) U.S. Cl.
CPC ...................................... *A01K 23/00* (2013.01)

(58) Field of Classification Search
CPC .... A01K 23/00; A01K 23/005; E01H 1/1206; E01H 2001/1293; E01H 2001/126
USPC .................. 119/867, 868, 869, 854, 850, 161; 294/1.3, 1.4, 1.5; 604/317, 327
See application file for complete search history.

(56) References Cited

U.S. PATENT DOCUMENTS

| | | | | |
|---|---|---|---|---|
| 3,875,903 A * | 4/1975 | Sarvary | ................. | A01K 23/00 119/868 |
| 5,315,960 A * | 5/1994 | Lamp | .................... | A01K 23/00 119/868 |
| 5,386,802 A * | 2/1995 | Hang-Fu | ................. | A01K 23/00 119/868 |
| 5,819,691 A * | 10/1998 | Lavi | ....................... | A01K 23/00 119/868 |
| 6,494,168 B2 * | 12/2002 | Weng | .................... | A01K 23/00 119/868 |
| 6,722,319 B1 * | 4/2004 | Chiu | ..................... | A01K 23/00 119/868 |
| 7,461,616 B2 * | 12/2008 | Tsai | ....................... | A01K 23/00 119/867 |
| 7,861,677 B2 * | 1/2011 | Habig | ................... | A01K 23/00 119/868 |
| 8,015,949 B2 * | 9/2011 | Dolub | ................... | A01K 23/00 119/868 |
| 8,944,012 B2 * | 2/2015 | Hazan | ................... | A01K 23/00 119/867 |
| 2008/0127909 A1 * | 6/2008 | Albalas | .................. | A01K 23/00 119/868 |
| 2010/0187842 A1 * | 7/2010 | Buzby | ....................... | B25B 7/12 294/111 |
| 2011/0303162 A1 * | 12/2011 | Morman | ................ | A01K 23/00 119/858 |

* cited by examiner

*Primary Examiner* — Trinh Nguyen

(57) ABSTRACT

A hands-free method for handling animal waste entails securing a support structure to an animal, preferably a dog. The support structure includes a first latching mechanism which is used to secure a disposable waste receptacle. The disposable waste receptacle is handled via a manipulating tool and corresponding second latching mechanism, with the manipulating tool being operated by means of a user interface. The manipulating tool is used to couple the disposable waste receptacle to the first latching mechanism. After the disposable waste receptacle accumulates excrement, the manipulating tool is used to decouple the disposable waste receptacle from the support structure and discard the disposable waste receptacle in a separate trash receptacle.

4 Claims, 13 Drawing Sheets

SYSTEM FOR HANDS-FREE PET WASTE RECEPTACLE

The current application claims a priority to the U.S. Provisional Patent application Ser. No. 61/730,849 filed on Nov. 28, 2012.

FIELD OF THE INVENTION

The present invention relates generally to a method for utilizing a strap system, waste container, and manipulating tool in order to provide a hands-free method of catching waste from animals such as dogs.

BACKGROUND OF THE INVENTION

Dogs are popular pets in the United States and across the world, with many persons having one or more dogs. While dog ownership has many positives, there are responsibilities as well. One of these responsibilities includes the collection of dog waste and poop, a hassle for many dog owners. Currently there are numerous methods in which dog waste is collected, with solutions ranging from simple to complicated. Many people use basic methods, such as a plastic bag, or sometimes a dedicated disposable scooper, to pick up their pet's waste. While this method is simple, it can prove difficult for people with injuries or limited range of motion. Others still find the entire process to be too much of a bother and leave their pet's waste to sit, regardless of any local regulations.

To address the above drawbacks, there have been some inventions that utilize a strap system to secure a waste receptacle to the rear of the dog. The idea behind these inventions is to make the poop collection process easier; with a strap system, a person does not need to actively collect pet waste, but rather can passively allow waste to accumulate in a container and dispose of the waste filled container after the dog has defecated. However, these strap systems still require a person to directly interact with the waste receptacle. While certainly a step up from the basic plastic bag, many are adverse to the direct handling of waste material, and will shy away from the above strap systems. While having a bag positioned to catch waste is desirable, having to remove and manipulate said bag is unappealing, especially when the bag may have been dirtied due to the elements or even a diarrheic episode.

It is therefore an object of the present invention to provide a method for receiving waste from a pet such as a dog. It is a further object of the present invention to provide a waste receiving system that can be operated indirectly, without the need for personal handling of the waste container.

DETAIL DESCRIPTIONS OF THE INVENTION

All illustrations of the drawings are for the purpose of describing selected versions of the present invention and are not intended to limit the scope of the present invention.

The present invention provides a method for utilizing an attachable waste-collecting apparatus in conjunction with an animal. The present invention is carried out in conjunction with a support structure 1, a disposable waste receptacle 13, and a manipulating tool 2. The support structure 1 provides a mounting point for the disposable waste receptacle 13, which can be handled via the manipulating tool 2. In this manner, animal waste such as that from dogs can be dealt with without the use of direct contact by human hands. The present invention is provided primarily for use with dogs, but can ultimately be utilized and adapted for any quadruped or even biped.

Figure 1:
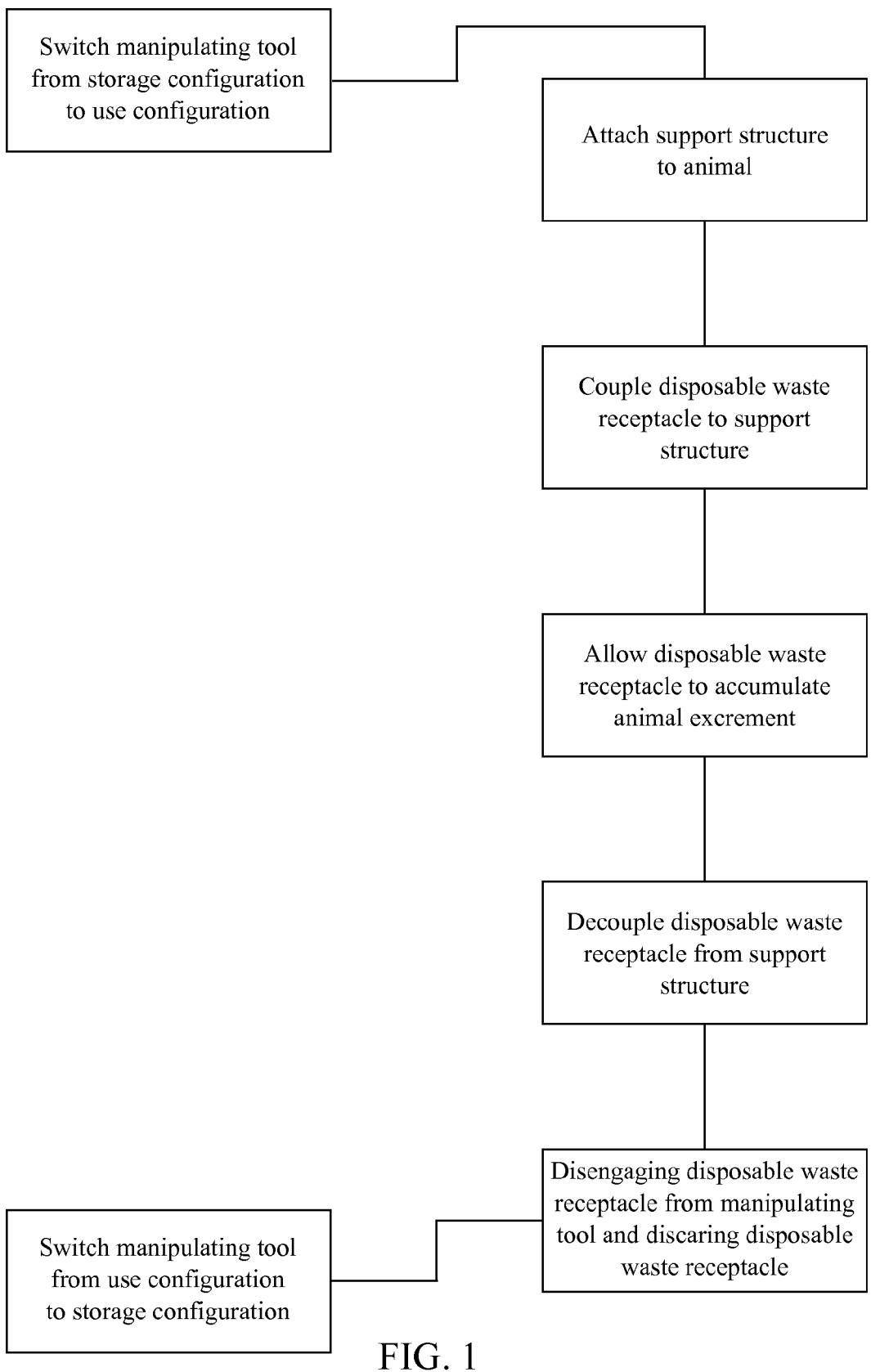
FIG. 1 is an outline of the general process of the present invention.

The general process of the present invention as detailed in FIG. 1 involves securing the support structure 1 to an animal, using the manipulating tool 2 to couple the disposable waste receptacle 13 to the support structure 1, leaving the disposable waste receptacle 13 in the coupled positioned until it receives waste from the animal, and finally using the manipulating tool 2 to decouple the disposable waste receptacle 13 from the support structure 1, after which the disposable waste receptacle 13 can be discarded.

Figure 2:
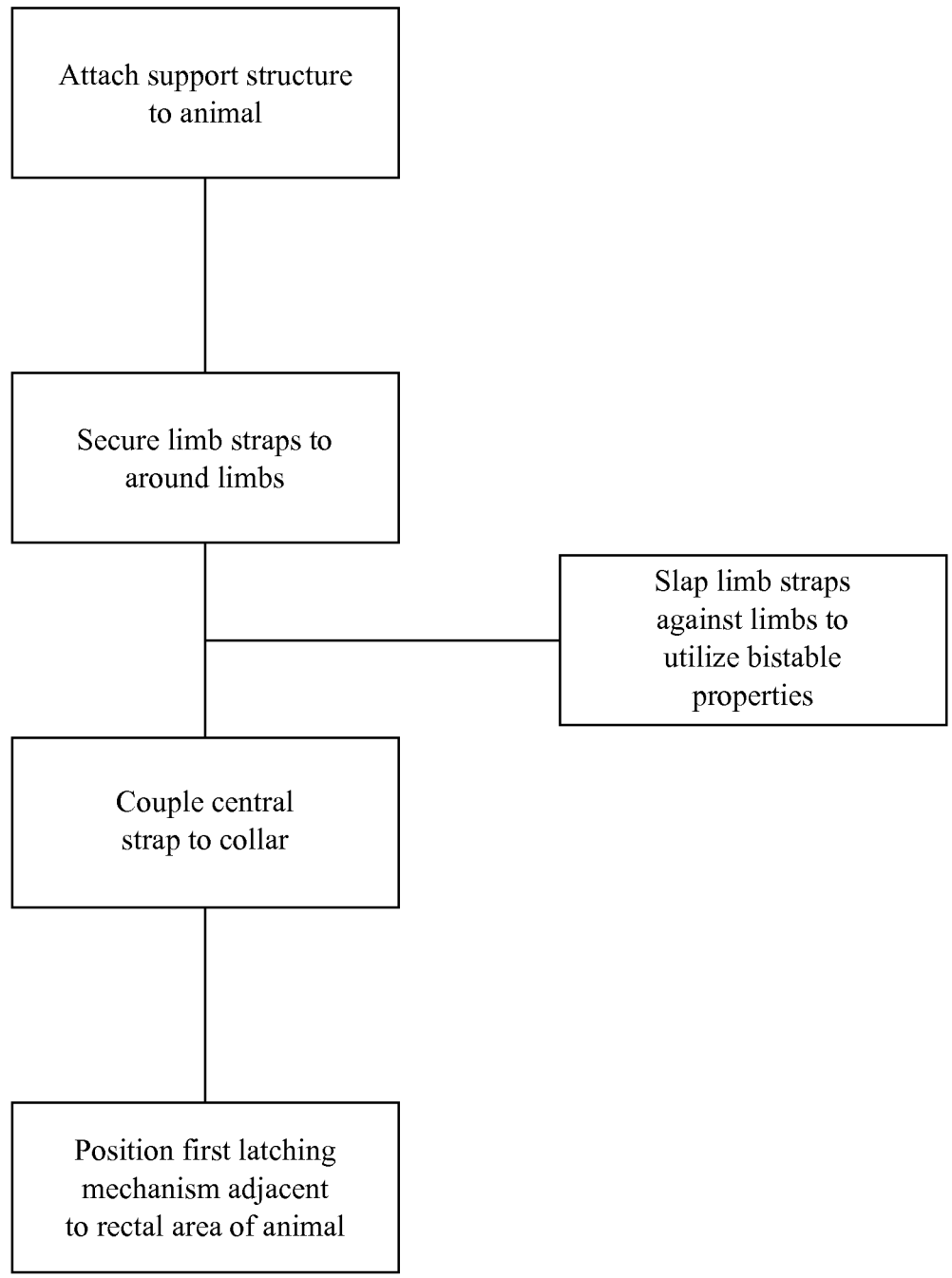
FIG. 2 is an outline of the process of securing a support structure to an animal.

In order to provide an attachment system for the present invention, the support structure 1 comprises a plurality of limb straps 12, a first latching mechanism 14, and a central strap 11. Each of the plurality of limb straps 12 is wrapped and secured around a corresponding limb of an animal, preferably a leg. The first latching mechanism 14 is provided to hold and secure the disposable waste receptacle 13. Providing additional support, the central strap 11 is coupled to a collar of the animal, such that the central strap 11 is positioned along the length of the animal's back. The plurality of limb straps 12, the first latching mechanism 14, and the central strap 11 are preferably interconnected in order to provide a more secure support structure 1 for receiving the disposable waste receptacle 13. The first latching mechanism 14 is preferably positioned next to the animal's rectal area, such that an attached disposable waste receptacle 13 is capable of catching animal excrement. The process of attaching the support structure 1 to the animal is outlined in FIG. 2.

In the preferred embodiment the plurality of limb straps 12 are made from a bistable material, such as bistable springs as used in the slap bands which were popular in the United States during the 1980s. In this preferred embodiment, the process of securing the plurality of limb straps 12 to their corresponding limbs further entails applying a gentle and sudden force to each individual limb strap. Using bistable materials for the construction of the limb straps 12 allows the limb straps 12 to quickly be secured to an animal by gently contacting each limb strap with the corresponding limb, resulting in the limb strap curling around the limb. This provides an easy and expedient way of securing each of the plurality of limb straps 12 to their respective limbs.

Figure 3:
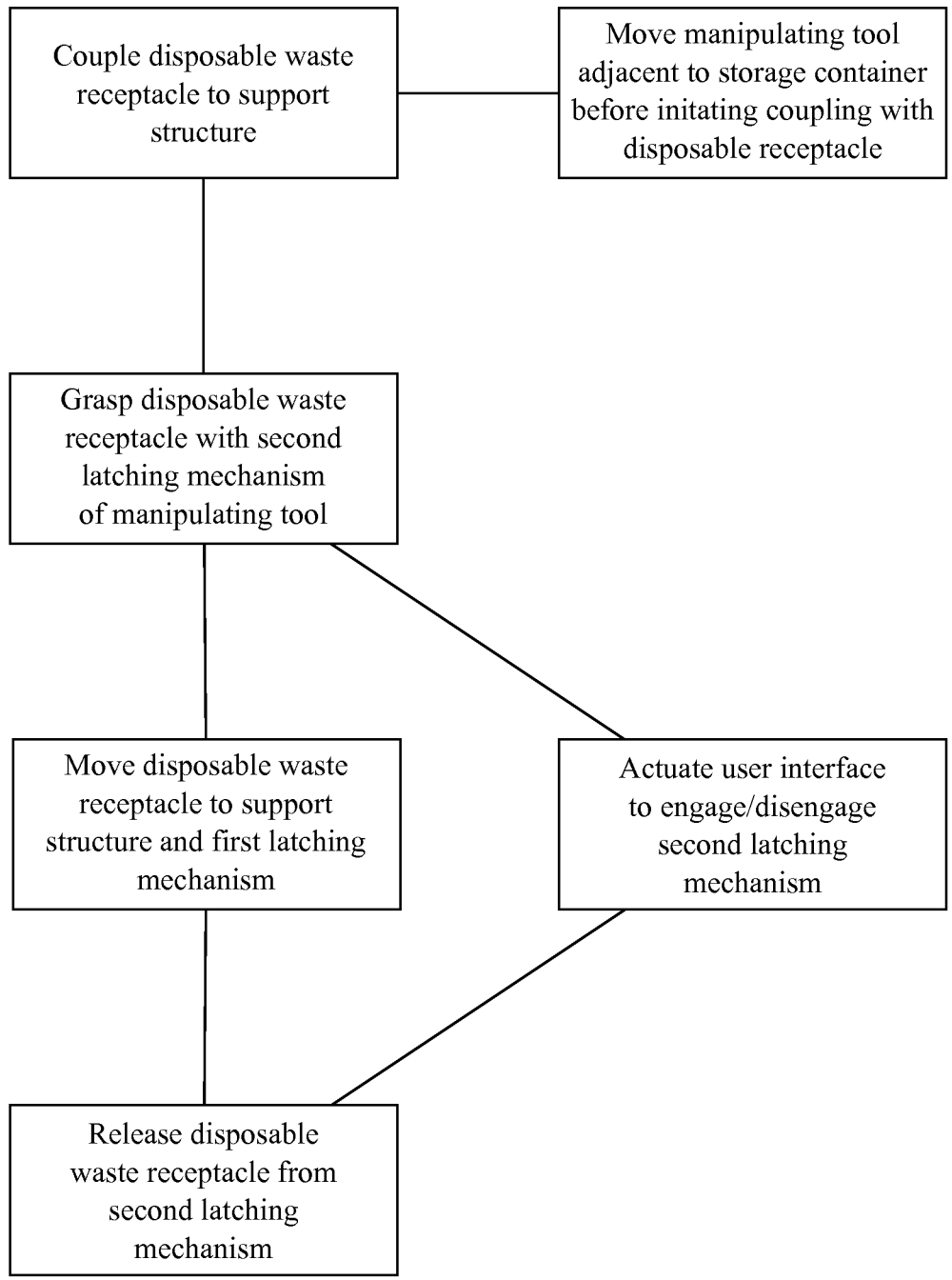
FIG. 3 is an outline of the process of coupling a disposable waste receptacle to the support structure.

After the support structure 1 has been attached to the animal, the manipulating tool 2 is used to handle the disposable waste receptacle 13. As a result, the present invention is considered to be indirectly hands-free, as a user is does not need to touch the disposable waste receptacle 13 directly, instead only interacting with the manipulating tool 2. The manipulating tool 2 comprises a user interface 21 and a second latching mechanism 22. The user interface 21 allows a user to operate and control the manipulating tool 2, while the second latching mechanism 22 allows the manipulating tool 2 to securely grasp or release the disposable waste receptacle 13. When using the manipulating tool 2 to couple the disposable waste receptacle 13 to the support structure 1, the second latching mechanism 22 is used to grasp the disposable waste receptacle 13. By means of the user interface 21 the second latching mechanism 22 can be engaged or disengaged. The grasping step (i.e. engaging the waste receptacle) is performed by actuating the user interface 21 of the manipulating tool 2. For example, the actuation might involve pressing a button, pulling a trigger, flipping a switch, or any similar operation dependent on the type of manipulating tool 2 used. The actuation causes the manipulating tool 2 to secure, via the second latching mechanism 22, the disposable waste receptacle 13. The manipulating tool 2 is then used to move the disposable waste receptacle 13 to the disposable waste receptacle 13. The disposable waste receptacle 13 is then moved next to the support structure 1. Next, the first latching mechanism 14 is used to receive and secure the disposable waste receptacle 13, thus coupling the disposable waste receptacle 13 to the support structure 1. Once the disposable waste receptacle 13 has been coupled to the support structure 1, the second latching mechanism 22 is disengaged, releasing the disposable waste receptacle 13 from the manipulating tool 2. The disengaging of the second latching mechanism 22 is accomplished by oppositely actuating the user interface 21. For example, provided the second latching mechanism 22 is engaged by flipping a switch to a second position, the second latching mechanism 22 is disengaged by flipping the switch back to its original position. Disengaging the second latching mechanism 22 is only performed after the disposable waste receptacle 13 has been attached to the support structure 1. This group of steps is outlined in FIG. 3.

Once the disposable waste receptacle 13 has been coupled to the support structure 1, waste produced by the animal will automatically be collected in the disposable waste receptacle 13, negating the need for a separate handheld waste collecting device. The present invention can be implemented in a number of situations in which an animal might expel waste. For example, whether taking a dog for a walk or simply letting a dog out to play, implementation of the present invention ensures that all excrement will be collected by the disposable waste receptacle 13. As a result, there is no need for direct contact waste collecting methods, such as scoops or plastic bags. Instead, after waiting and allowing an interval of time to pass (said interval most commonly beginning when a dog is taken outdoors and terminating immediately before the dog returns indoors), the disposable waste receptacle 13 can be removed and discarded by means of the manipulating tool 2.

Figure 4:
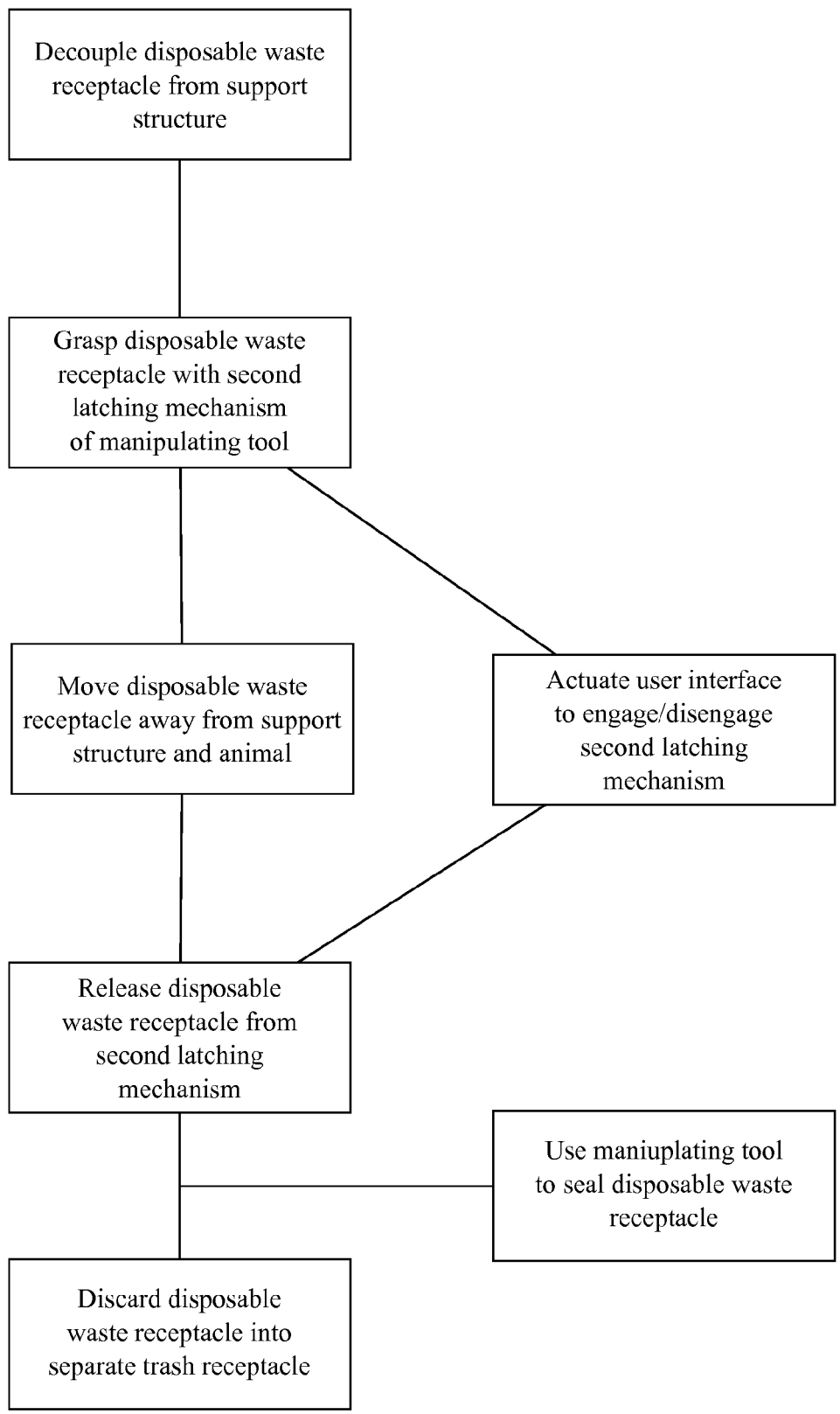
FIG. 4 is an outline of the process of decoupling the disposable waste receptacle from the support structure.

After the interval of time has passed, the disposable waste receptacle 13 can be discarded. This is achieved by decoupling the disposable waste receptacle 13 from the support structure 1, accomplished by reversing the steps of coupling the disposable waste receptacle 13 to the support structure 1. Decoupling of the disposable waste receptacle 13 entails engaging and disengaging the second latching mechanism 22 via the user interface 21. First, the user interface 21 is actuated in order to grasp the disposable waste receptacle 13 with the second latching mechanism 22. Then, the manipulating tool 2 and grasped disposable waste receptacle 13 are moved away from the animal and support structure 1, resulting in the decoupling of the disposable waste receptacle 13 from the support structure 1. The disposable waste receptacle 13 can then be discarded, such as in a trash can, by oppositely actuating the user interface 21 in order to disengage the latching mechanism and release the disposable waste receptacle 13. As described earlier, the actuation of the user interface 21 can potentially entail pressing a button, flipping a switch, pulling a trigger, or any similar operation dependent on the type of manipulating tool 2 used. In this manner, the disposable waste receptacle 13, along with accumulated excrement, can be removed and thrown away without the need for a user's hands to directly contact it. Preferably, the manipulating tool 2 is used to seal the waste receptacle prior to discarding, which is accomplished by actuating the user interface 21. These finals steps of the present invention are outlined in FIG. 4.

In the preferred embodiment of the present invention, a plurality of the disposable waste receptacle 13s are supplied in a container. The container ensures easy access to the disposable waste receptacle 13, allowing a person to use the manipulating tool 2 to grab a disposable waste receptacle 13 directly from the container. Not only does the container serve as a convenient storage means for the disposable waste receptacle 13s, it allows the manipulating tool 2 direct access to the disposable waste receptacle 13s. Resultantly, a user does not need to directly handle the disposable waste receptacle 13, even prior to use.

Furthermore, in the preferred embodiment of the present invention, the manipulating tool 2 can be switched between a storage configuration and an in-use configuration, allowing for a compact manipulating tool 2 which is more easily stored without hindering functionality. The manipulating tool 2 is switched between the storage configuration and the in-use configuration by actuating the user interface 21. For example, provided a telescoping manipulating tool 2, the in-use configuration could accomplished by flipping a switch to extending the telescoping manipulating tool 2. Similarly, flipping the switch in the opposite direction retracts the telescoping manipulating tool 2 to return it to the storage configuration. As another example, the manipulating tool 2 could be provided via a pivoting arm which is housed inside a body of the manipulating tool 2. In this example, pressing a button one time could rotate the pivoting arm into the in-use configuration, while pressing the button a second time could return the pivoting arm to the body, i.e. the storage configuration. These are just a few examples of how the manipulating tool 2 can be operated in order to switch between a storage configuration and an in-use configuration, and are not meant to be limiting to the method of the present invention.

An example apparatus for use with the present invention is described below, and not intended to limit the range of support structure 1, disposable waste receptacle 13s, and manipulating tool 2s which can be used for the process of the present invention.

In this example apparatus, the plurality of limb straps 12 comprise a first limb strap and a second limb strap, with a first leg holder and a second leg holder being connected to the respective leg straps. The first limb strap and second limb strap are connected to the central strap 11 in a Y-orientation, with the central strap 11 intended to be positioned across a dog's back while one leg strap is wrapped around each of the dog's rear legs. The manipulating tool 2 is a wand which comprises a handle section and a tong section. The disposable waste receptacle 13 comprises a first rail, a second rail, and a flexible waste container, with the former two components interacting with both the leg holders and the tong section.

Figure 5:
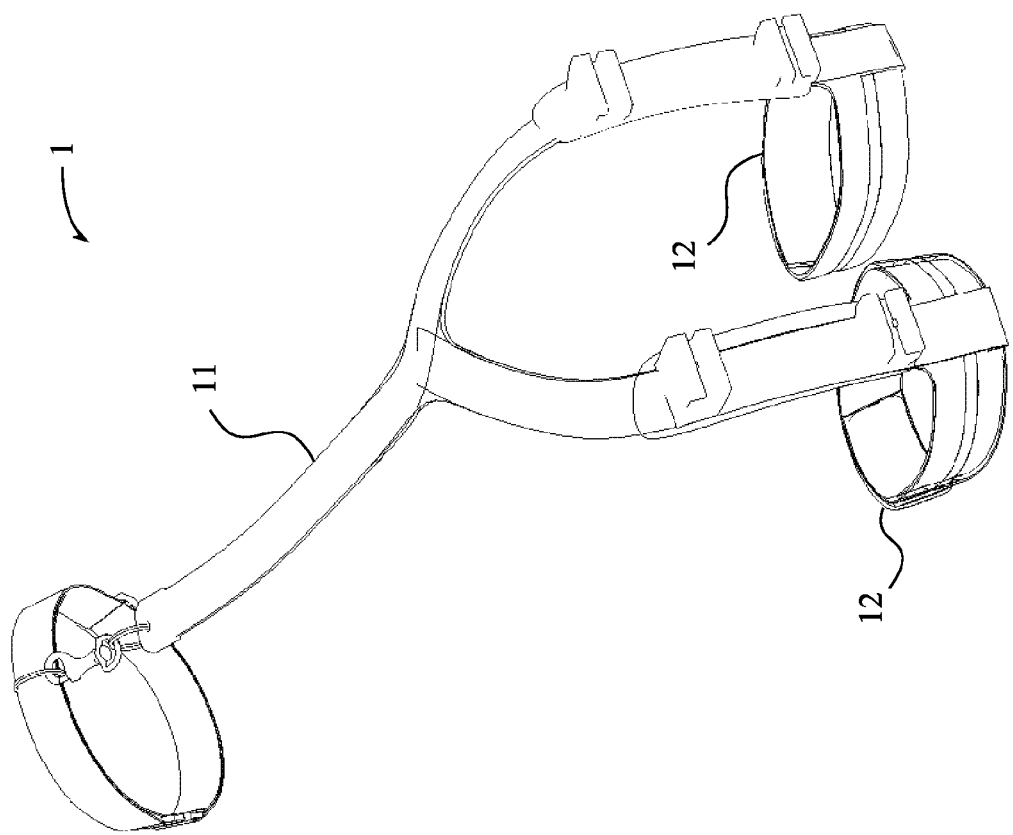
FIG. 5 is a perspective view of one embodiment of a support structure of the present invention.

The strap system comprises a primary arm and two split arms, forming a Y-shape when seen from a top view. The central strap 11 attaches to the collar of a dog and runs the length of the dog's back. When the central strap 11 reaches the dog's hindquarters, the central strap 11 connects to the two limb straps 12. Each of the limb straps 12 is intended to wrap around one of the dog's rear legs. The limb straps 12 are made from a bistable material; this allows the limb straps 12 to quickly be secured to a dog's legs by imparting a force upon the limb straps 12. This results in the bistable material causing the limb straps 12 to curl, thus wrapping around the dog's legs. The bistable nature of the limb straps 12 means a user can quickly set up the support structure 1, simply attaching the central strap 11 to a collar (akin to coupling a leash to the collar) and lightly slapping the limb straps 12 against the dog's rear legs. The straps of the support structure 1 are preferably made from an elastic material, allowing the support structure 1 to naturally adjust to variations in size and shape of different dogs. In alternative embodiments, the support structure 1 may be provided with buckles, clips, or other adjusters and fasteners. These could be used to replace or support the flexible central strap 11 and limb straps 12 employed in the preferred embodiment. This example support structure 1 is illustrated in FIG. 5.

The first leg holder and the second leg holder are connected to the first limb strap and the second limb strap, respectively, such that the two leg holders flank the dog's rectal area after the limb straps 12 are put into place. The leg holders are contoured such that they rest snugly against the dog's backside, helping to prevent unwanted movement as well as increasing comfort for the dog.

The first leg holder and the second leg holder act as the first latching mechanism 14, with each comprising an upper rail system, a lower rail system, and a locking mechanism 141. The upper rail system and lower rail system each traverse through each leg holder, beginning with a wide aperture until narrowing to a size that is designed to fit the disposable waste receptacle 13. The wide aperture is placed on the outside face of the leg holders. This allows the disposable waste receptacle 13 to be installed from either side of the dog, with the aperture design of the rail systems aiding in initial placement of the disposable waste receptacle 13. Once a user manages to place the disposable waste receptacle 13 in the aperture, they can simply push the disposable waste receptacle 13 into place, with the rail system guiding the disposable waste receptacle 13 to a locking position. The locking mechanism 141 can be implemented utilizing a variety of concepts. In the preferred embodiment, the locking mechanism 141 comprises a spring-loaded lock, which snaps into a matching notch on the rail systems. In other embodiments, different versions of the locking mechanism 141 could be implemented. For example, a magnet in the rail system could be used to attract and secure a magnet in the disposable waste receptacle 13. Alternatively, a latch could be included on the leg holders, being activated to hold the disposable waste receptacle 13 in position. While these methods and other methods are possible, attention must be paid to the usability of the invention. While magnets could be used independently as the locking mechanism 141, the magnets would have to be strong enough to hold the disposable waste receptacle 13 in place, but not so strong that the wand is unable to pull the disposable waste receptacle 13 out of the leg holders. On the other hand, the latch embodiment is secure and easy to lock or unlock, but would be difficult to operate with the wand and most likely require the use of hands. Any alternative locking mechanism 141s used should allow a person to insert and remove the disposable waste receptacle 13 securely and without the use of direct hand contact; a user should only have to hold the wand, making direct contact with the disposable waste receptacle 13 and leg holders unnecessary.

Figure 6A:
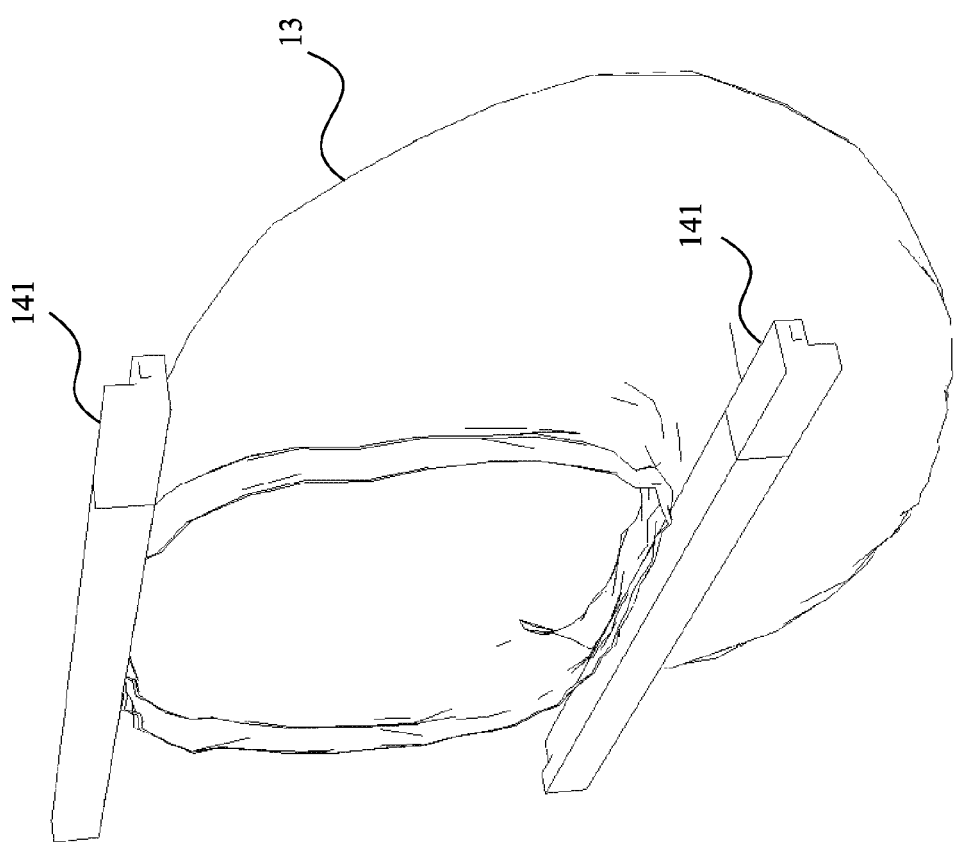
FIG. 6A is a front perspective view of one embodiment of a disposable waste receptacle of the present invention.
Figure 6B:
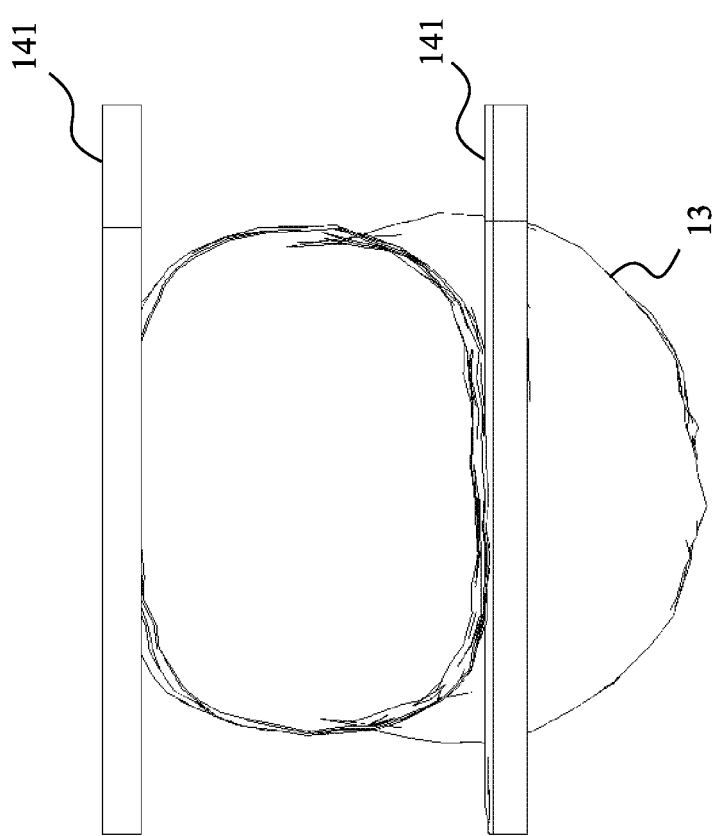
FIG. 6B is a front view of one embodiment of a disposable waste receptacle of the present invention.
Figure 6C:
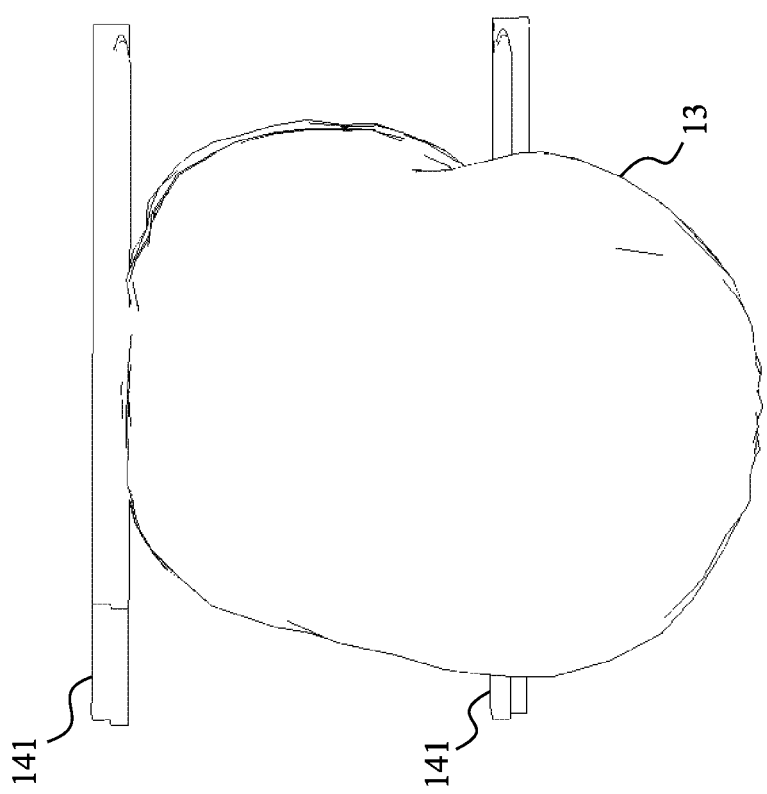
FIG. 6C is a rear perspective view of one embodiment of a disposable waste receptacle of the present invention.
Figure 7A:
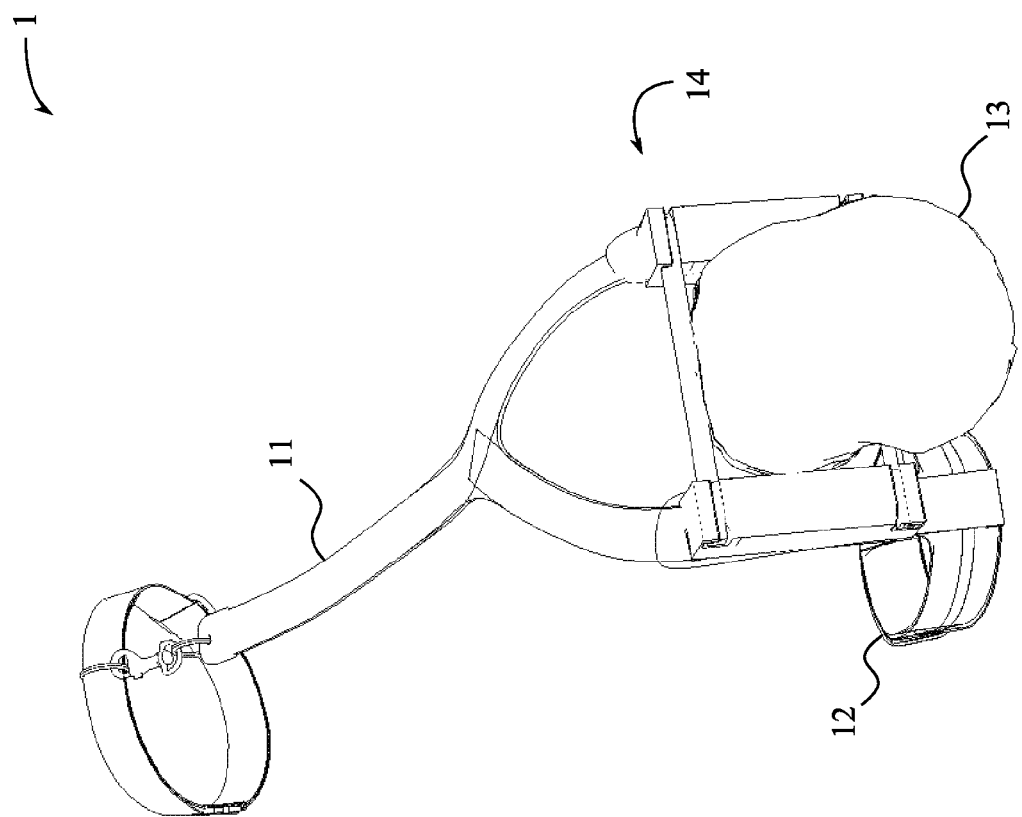
FIG. 7A is a perspective view of one embodiment of the present invention showing a coupled support structure and disposable waste receptacle.
Figure 7B:
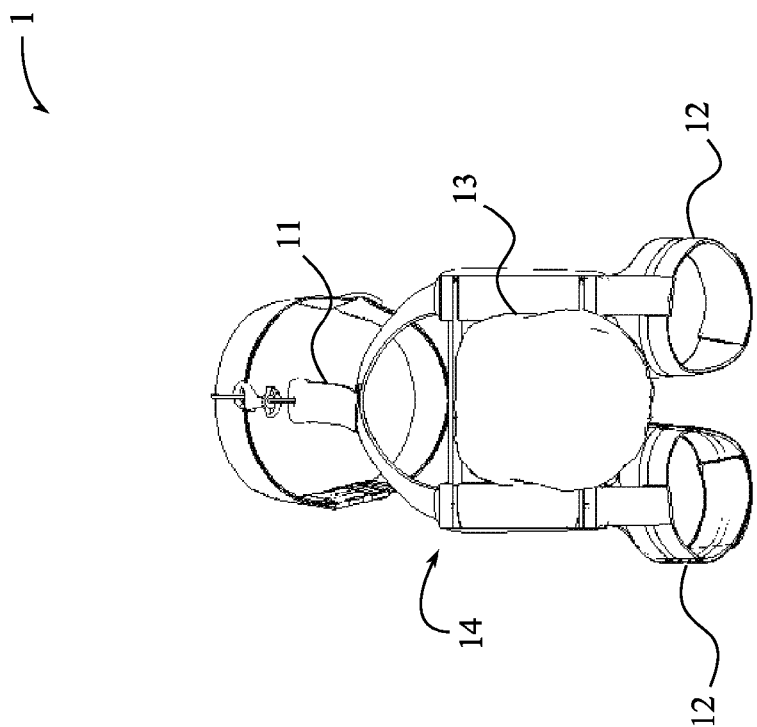
FIG. 7B is a rear view of one embodiment of the present invention showing a coupled support structure and disposable waste receptacle.
Figure 7C:
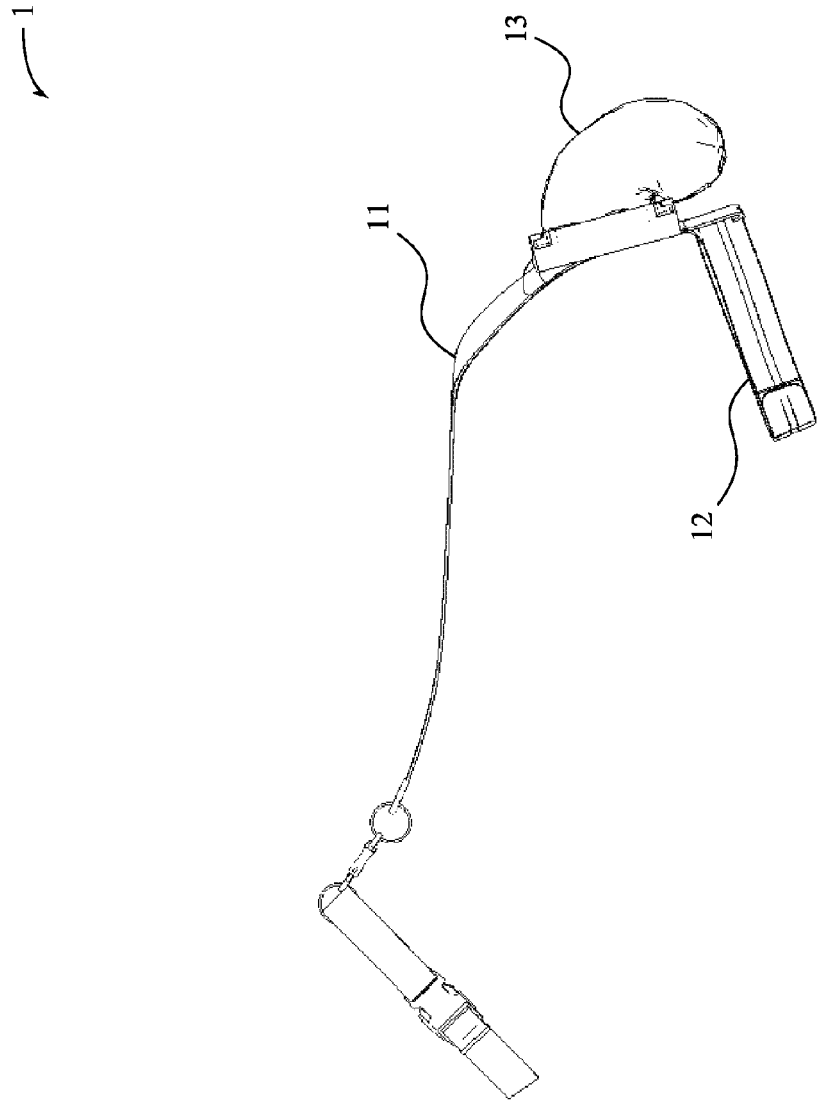
FIG. 7C is a side view of one embodiment of the present invention showing a coupled support structure and disposable waste receptacle.
Figure 7D:
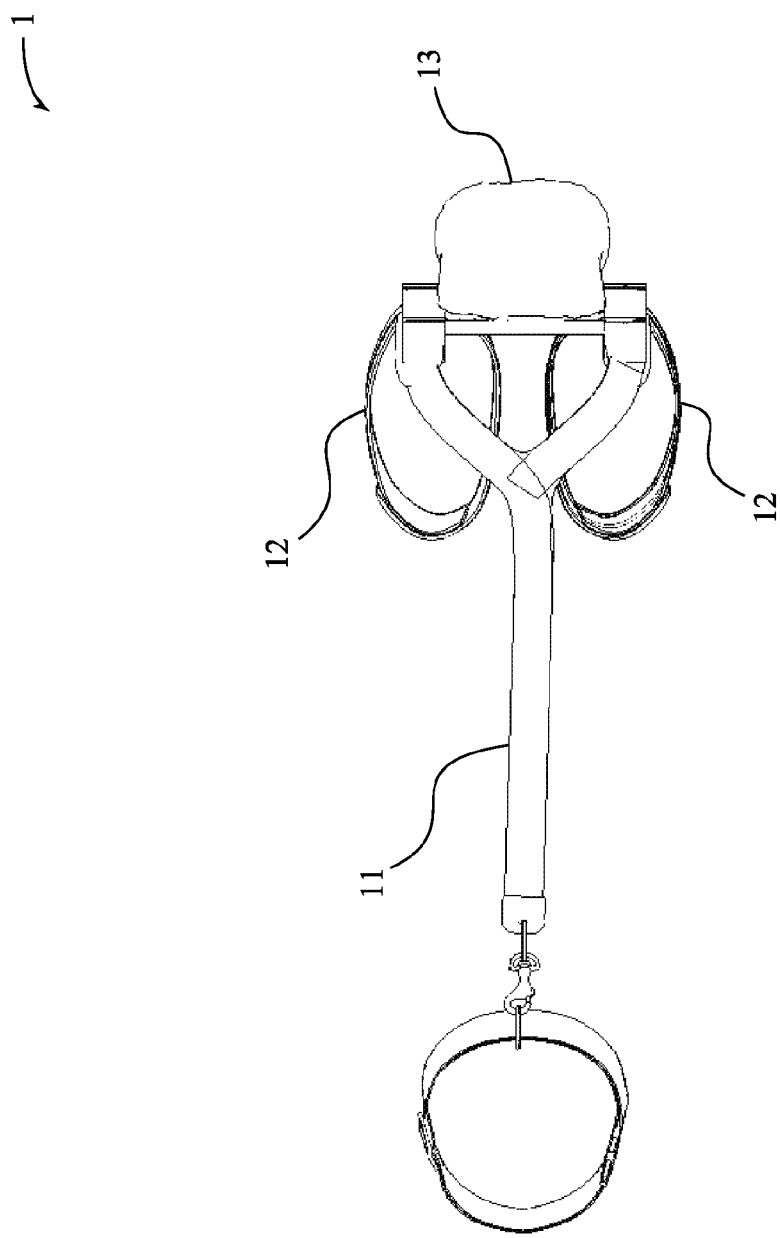
FIG. 7D is a top view of one embodiment of the present invention showing a coupled support structure and disposable waste receptacle.

The first rail and a second rail of the disposable waste receptacle 13 are intended to slide into the first rail system and the second rail system of the leg holders. Connected between the first rail and the second rail is a flexible waste container, such as a bag. The disposable waste receptacle 13 is designed to be compact for storage, but easily accessed and removed when ready to be inserted into the leg holders. The first rail and second rail each comprise a wand opening located on the outside face, designed to allow the wand to interact with the disposable waste receptacle 13. In addition, the first rail and the second rail comprise a lock receptacle designed to engage with the locking mechanism 141 of the leg holders. In a storage state, the first rail and the second rail are adjacent to each other, resulting in the flexible container of the disposable waste receptacle 13 being closed. This allows the disposable waste receptacle 13 to be stored compactly, such as in a container containing a plurality of disposable waste receptacle 13s. To remove a disposable waste receptacle 13 from the container, a person simply inserts the tongs of the wand into the wand openings. The wand is then used to pull the disposable waste receptacle 13 from the container, at which point the first rail and second rail are separated from each other to open the bag. The open disposable waste receptacle 13 can then be placed in the leg holders, ready to receive waste from the dog. The positioning of the disposable waste receptacle 13 and leg holders results in the mouth of the flexible waste container being located on a vertical plane adjacent to the dog's anus. The disposable waste receptacle 13 can be removed by disengaging the locking mechanism 141 from the lock receptacle and using the wand to remove the disposable waste receptacle 13 from the leg holders. The example disposable waste receptacle 13 is shown in FIG. 6A-FIG. 6C, while FIG. 7A-FIG. 7D demonstrate how the disposable waste receptacle 13 can be coupled to the support structure 1.

In the preferred embodiment, the lock receptacle is a simple notch designed to receive the spring-loaded lock of the leg holder. The notch is angled on one side such that the disposable waste receptacle 13 pushes the spring-loaded lock up as the disposable waste receptacle 13 is pushing into the leg notches, until the spring-loaded lock is aligned with the notch; at this point the spring-loaded lock drives into the notch and prevents the disposable waste receptacle 13 from being moved. The notch is slightly deeper than the spring-loaded lock, such that the tongs from the wand can slide to a point just below the spring-loaded lock and notch. In the preferred embodiment, this tip of the tong is magnetized to repel a magnet in the tip of the spring-loaded lock. This allows the tongs of the wand to repel the spring-loaded magnet, imparting enough force to lift the spring-loaded lock out of the notch, allowing the disposable waste receptacle 13 to be removed. In this manner the disposable waste receptacle 13 can easily be installed and removed from the leg holders without the direct use of hands.

Figure 8:
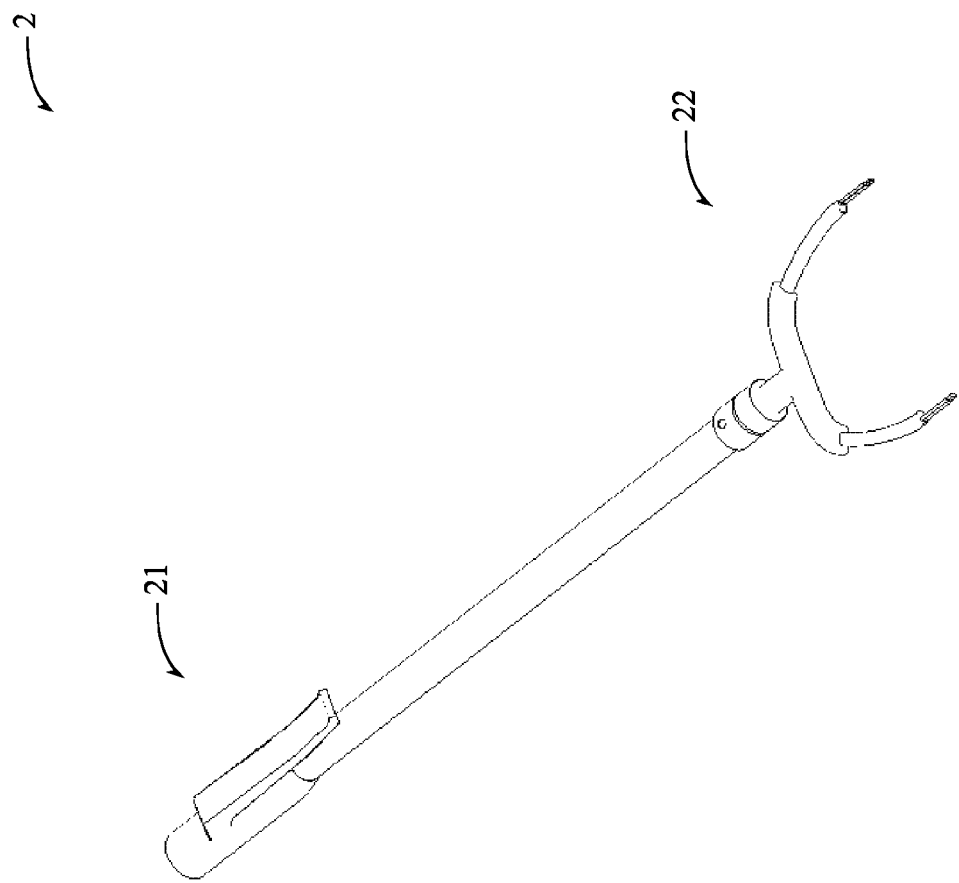
FIG. 8 is a perspective view of one embodiment of a manipulating tool of the present invention.

The tongs of the wand act as the second latching mechanism 22. The tong section is rotatably connected to the handle section, such that the tongs can rotate as necessary to slide the disposable waste receptacle 13 into the leg holders. The handle section comprises the user interface 21, which further comprises, a tong adjustment control, a rotation control, and a rotation lock. The tong adjustment control allows a user to open and close the tongs as necessary, such as when pulling a disposable waste receptacle 13 from a container. The rotation control is a swivel that allows a person to manually rotate the tong section, such as when trying to orient the wand with the leg sections in order to lock in the disposable waste receptacle 13. The rotation lock enables a user to prevent or allow the tong section from rotating. As a user tries to align the tongs with the disposable waste receptacle 13, they can leave the tongs unlocked, allowing the tong section rotate as needed to engage the disposable waste receptacle 13 with the leg holders. When the tong section is properly aligned, a user can lock the tongs from rotating, providing a stead grip for interacting with the disposable waste receptacle 13 and the leg holders. This example manipulating tool 2 is illustrated in FIG. 8.

Overall, the present invention has been designed to provide an indirect hands-free method of handling animal waste which can be performed using a basic set of tools, of which the above apparatus is just one example. By using a manipulating tool 2 a disposable waste receptacle 13 can be coupled to a support structure 1 which itself is attached to an animal. The disposable waste receptacle 13 can then collect animal excrement, after which a user simply can remove the loaded disposable waste receptacle 13 using the manipulating tool 2, again avoiding the need for direct handling. Overall, the present invention provides a sanitary, easy, and quick method of setting up and discarding a disposable waste receptacle 13 for a dog.

Although the invention has been explained in relation to its preferred embodiment, it is to be understood that many other possible modifications and variations can be made without departing from the spirit and scope of the invention as hereinafter claimed.

What is claimed is:

1. An indirect hands-free method of handling animal waste comprises the steps of:
    providing an attachable waste-collecting apparatus, wherein the waste collecting apparatus comprises a support structure, a disposable waste receptacle, and a manipulating tool;
    wherein the manipulating tool comprises a user interface;
    securing the support structure to an animal in order to receive and support the waste receptacle;
    switching the manipulating tool from a storage configuration to an in-use configuration by actuating the user interface;
    coupling the disposable waste receptacle to the support structure by engaging the manipulating tool to the disposable waste receptacle;
    waiting for an interval of time in order to allow the waste receptacle to receive waste from the animal;
    decoupling the disposable waste receptacle from the support structure by engaging the manipulating tool to the disposable waste receptacle;
    sealing the disposable waste receptacle with the manipulating tool by actuating the user interface;
    disengaging the disposable waste receptacle from the manipulating tool in order to discard the disposable waste receptacle;
    switching the manipulating tool from an in-use configuration to a storage configuration by actuating the user interface;
    the manipulating tool being switched to the in-use configuration by flipping a telescope switch a first direction, thereby extending a telescoping portion of the manipulating tool;
    the manipulating tool being switch to the storage configuration by flipping the telescope switch a second direction, thereby retracting the telescoping portion of the manipulating tool;
    wherein the manipulating tool comprises a user interface and a second latching mechanism;
    wherein the user interface engages and disengages the second latching mechanism;
    when said second latching mechanism is engaged, a switch is in a first position;
    said disengaging comprises flipping the switch to a second position;
    said engaging comprises flipping the switch to a first position;
    grasping the disposable waste receptacle with the second latching mechanism by actuating the user interface;
    coupling the disposable waste receptacle to the support structure by moving the disposable waste receptacle adjacent to the support structure with the manipulating tool and by grasping the disposable waste receptacle with the second latching mechanism, said grasping being performed by actuating the user interface of the manipulation tool;
    moving the disposable waste receptacle next to the support structure; and
    releasing the disposable waste receptacle with the second latching mechanism by oppositely actuating the user interface, if the disposable waste receptacle is attached to the support structure.

2. The indirect hands-free method of handling animal waste as claimed in claim 1 further comprises the steps of:
    wherein the support structure comprises a plurality of limb straps and a first latching mechanism;
    wherein the support structure further comprises a central strap;
    wherein the plurality of limb straps, the first latching mechanism, and the central strap are interconnected to other;
    wrapping each of the plurality of limb straps around a corresponding limb of the animal;
    positioning the first latching mechanism adjacent to the rectal area of the animal; and
    coupling the central strap to a collar of the animal.

3. The indirect hands-free method of handling animal waste as claimed in claim 2 further comprises the step of:
    wherein each of the plurality of limb straps comprises a bistable locking mechanism;
    securing each of the plurality of limb straps to the corresponding limb by applying an impulse to each of the plurality of straps.

4. The indirect hands-free method of handling animal waste as claimed in claim 2 further comprises the steps of:
    wherein the manipulating tool comprises a user interface and a second latching mechanism;
    wherein the user interface engages and disengages the second latching mechanism;
    grasping the disposable waste receptacle with the second latching mechanism by actuating the user interface;

decoupling the disposable waste receptacle to the support structure by moving the disposable waste receptacle away from the support structure with the manipulating tool;

further moving the disposable waste receptacle away from the animal with the manipulating tool; and releasing the disposable waste receptacle with the latching mechanism by oppositely actuating the user interface.

\* \* \* \* \*